(12) United States Patent
Yamashita et al.

(10) Patent No.: US 12,416,355 B2
(45) Date of Patent: Sep. 16, 2025

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Kanagawa (JP); Hirohisa Yukawa, Tokyo (JP); Masahiro Kouya, Kanagawa (JP); Tomoo Ikeda, Gunma (JP); Kenji Kojima, Kanagawa (JP); Akira Higashiyama, Kanagawa (JP); Yasuaki Yumoto, Tokyo (JP); Tsutomu Itou, Shizuoka (JP); Kazuya Numata, Kanagawa (JP); Junnosuke Kawahara, Kanagawa (JP); Kazunori Akiyama, Kanagawa (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,938

(22) PCT Filed: Mar. 23, 2023

(86) PCT No.: PCT/JP2023/011608
§ 371 (c)(1),
(2) Date: Sep. 13, 2024

(87) PCT Pub. No.: WO2023/182445
PCT Pub. Date: Sep. 28, 2023

(65) Prior Publication Data
US 2025/0198504 A1 Jun. 19, 2025

(30) Foreign Application Priority Data
Mar. 23, 2022 (JP) .................. 2022-047604

(51) Int. Cl.
F16H 57/04 (2010.01)

(52) U.S. Cl.
CPC ..... F16H 57/0446 (2013.01); F16H 57/0402 (2013.01); F16H 57/0439 (2013.01); F16H 57/0441 (2013.01)

(58) Field of Classification Search
CPC .................. F16H 57/0441; F16H 57/0446
See application file for complete search history.

(56) References Cited

U.S. PATENT DOCUMENTS 9,845,869 B2    12/2017  Shirasaka et al.
9,878,605 B2 *  1/2018   Inoue .................. F16H 57/0476
(Continued)

FOREIGN PATENT DOCUMENTS

JP    2015-045401 A    3/2015
JP    2015-135155 A    7/2015

*Primary Examiner* — Thomas E Lazo
(74) *Attorney, Agent, or Firm* — Global IP Counselors, LLP

(57) ABSTRACT

A power transmission device for a vehicle includes a housing that accommodates a power transmission mechanism, a control valve configured to control an oil pressure supplied to the power transmission mechanism, a first pump and a second pump configured to supply oil to the control valve. The housing includes a first chamber that accommodates the power transmission mechanism and the first pump, and a second chamber that is arranged adjacent to the first chamber in a horizontal line direction. In the first chamber, the first pump is arranged such that an axis of rotation of the first pump extends along a direction of an axis of rotation of the power transmission mechanism. In the second chamber, the control valve is arranged upright. In the second chamber, the second pump is arranged upright with an axis of rotation of the second pump extending along a vertical direction.

8 Claims, 7 Drawing Sheets

(56) References Cited

U.S. PATENT DOCUMENTS

| | | |
|---|---|---|
| 10,371,254 B2 | 8/2019 | Fukui et al. |
| 10,808,831 B2 * | 10/2020 | Ikeda .................. F16H 57/0436 |
| 2010/0242669 A1 * | 9/2010 | Komizo .............. F16H 61/0025 74/606 R |
| 2016/0223070 A1 * | 8/2016 | Kito .................... F16H 57/0441 |
| 2016/0281842 A1 | 9/2016 | Fukui et al. |
| 2016/0319930 A1 | 11/2016 | Shirasaka et al. |
| 2017/0219085 A1 * | 8/2017 | Kiyokami ........... F16H 57/0441 |

* cited by examiner

POWER TRANSMISSION DEVICE

CROSS-REFERENCE TO RELATED APPLICATIONS

This application is a U.S. national stage application of International Application No. PCT/JP2023/011608, filed on Mar. 23, 2023. This application also claims priority to Japanese Patent Application No 2022-047604, filed on Mar. 23, 2022.

BACKGROUND

Technical Field

The present invention relates to a power transmission device.

Background Information

Japanese Patent Laid-Open Publication No. 2015-45401 discloses a drive device for a vehicle.

SUMMARY

In the case (housing) of this drive device (power transmission device) for a vehicle, a hydraulic control device (control valve) is arranged in an upright position. Further, an electric oil pump and a mechanical oil pump are disposed inside the case coaxially, aligned in the direction of the axis of rotation of the power transmission device.

Therefore, the electric oil pump and the mechanical oil pump are disposed in the direction of the axis of rotation. When the electric oil pump and the mechanical oil pump are aligned in the direction of the axis of rotation, the part of the case that houses the electric oil pump and the mechanical oil pump becomes larger in the direction of the axis of rotation.

Thus, there is a need to arrange the two pumps in the case without making the power transmission device larger in the direction of the axis of rotation.

One aspect of the present disclosure is a power transmission device for a vehicle, comprising a housing that accommodates a power transmission mechanism, a control valve that controls the oil pressure supplied to the power transmission mechanism, and a first pump and a second pump that supply oil to the control valve, wherein the housing has a first chamber that accommodates the power transmission mechanism and the first pump, and a second chamber that is arranged adjacent to the first chamber in the horizontal line direction, in the first chamber, the first pump is arranged such that the axis of rotation of the first pump aligns in the direction of the axis of rotation of the power transmission mechanism, in the second chamber, the control valve is arranged upright, and in the second chamber, the second pump is arranged upright with the axis of rotation aligned in the vertical direction.

According to one aspect of the present disclosure, since the axis of rotation of the first pump and the axis of rotation of the second pump are not coaxially arranged within the housing, the two pumps can be arranged within the housing without enlarging the power transmission device in the direction of the axis of rotation.

BRIEF DESCRIPTION OF THE DRAWINGS

Referring now to the attached drawings which form a part of this original disclosure.

DETAILED DESCRIPTION

Figure 1:
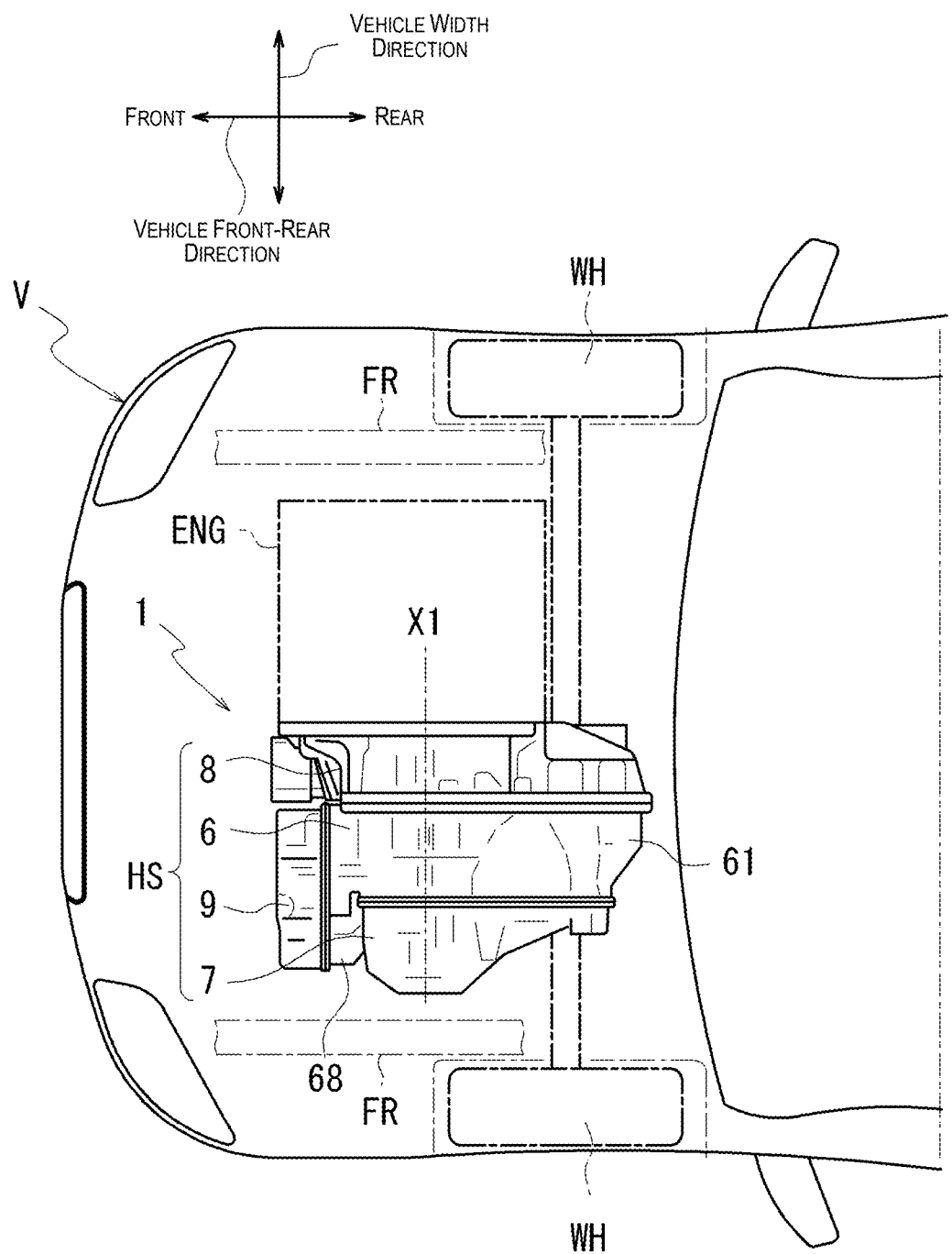
FIG. 1 is a schematic diagram illustrating the arrangement of the power transmission device in a vehicle.

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine).

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping when viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap when viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"The downstream side in the direction of rotation" means the downstream side in the direction of rotation when the vehicle is advancing or the direction of rotation during vehicle forward movement or during vehicle backward movement. It is appropriate to assume the downstream side in the direction of rotation is during vehicle forward movement, which is frequently the case.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL.

In this case, the plurality of pressure regulating valves need not be strictly arranged in single file in the direction of the vertical line VL.

For example, if the plurality of valve bodies are stacked to form the control valve, the following is possible. Namely, the plurality of pressure regulating valves may be arranged in the direction of the vertical line VL with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present disclosure is described below.

FIG. 1 is a schematic diagram illustrating the arrangement of a power transmission device 1 in a vehicle V.

Figure 2:
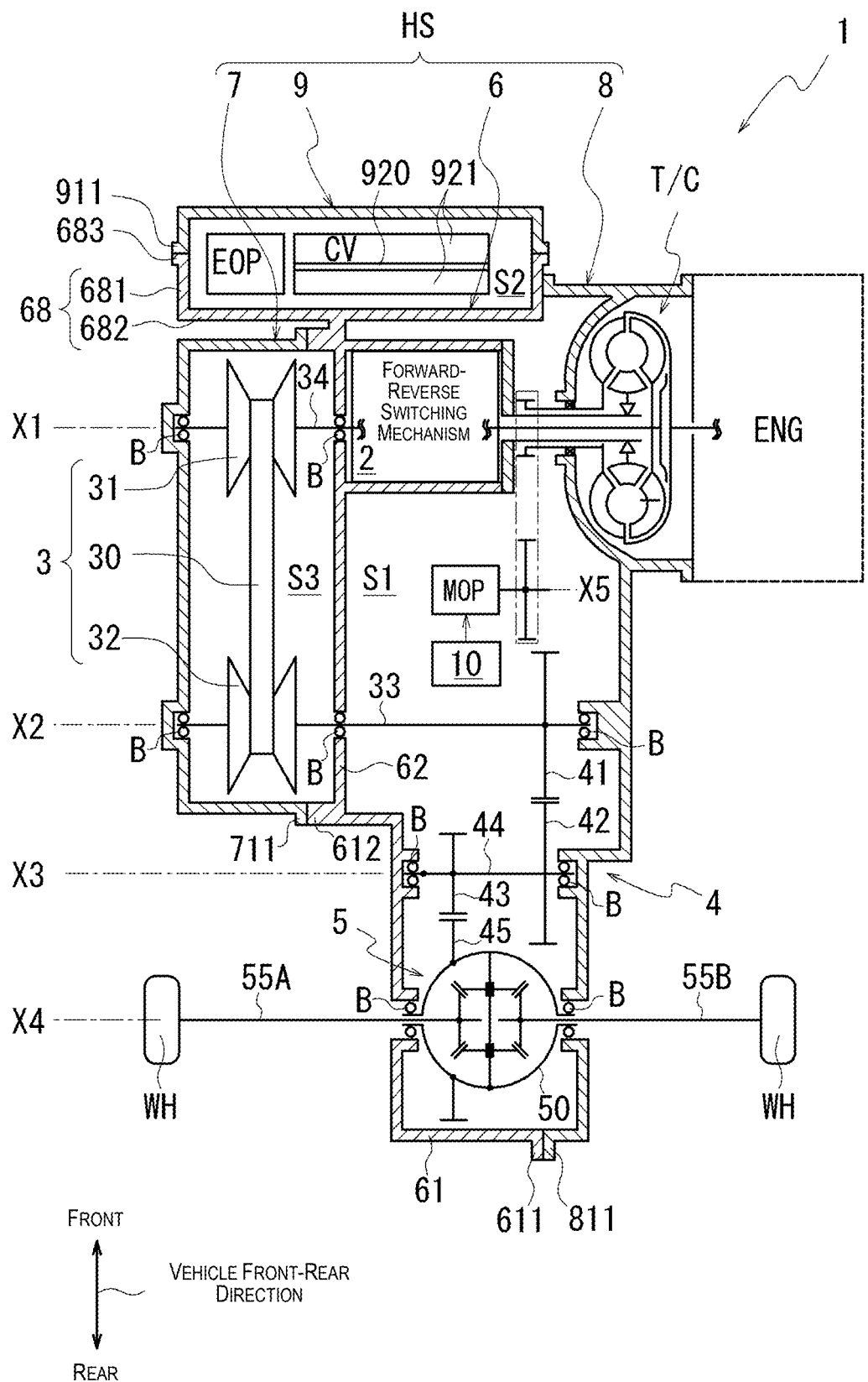
FIG. 2 is a schematic diagram illustrating a general configuration of the power transmission device.

FIG. 2 is a schematic diagram illustrating a general configuration of the power transmission device 1.

As shown in FIG. 1, the power transmission device 1 in the front of the vehicle V is arranged between left and right frames FR, FR. A housing HS of the power transmission device 1 is configured by a case 6, a first cover 7, a second cover 8, and a third cover 9.

As shown in FIG. 2, the interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, etc.

In the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates together with the output shaft 33 of the secondary pulley 32.

The idler gear 42 meshes with the output gear 41 in a manner allowing transmission of rotation. The idler gear 42 is spline-fitted to an idler shaft 44 and rotates together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3.

The final gear 45 and the drive shafts 55A, 55B are arranged coaxially on a common axis of rotation X4. In the power transmission device 1, the axes of rotation X1-X4 are set to have a positional relationship parallel to each other. In the following, these axes of rotation X1-X4 may, as needed, be referred to as the axis of rotation X of the power transmission device 1 (power transmission mechanism).

Figure 3:
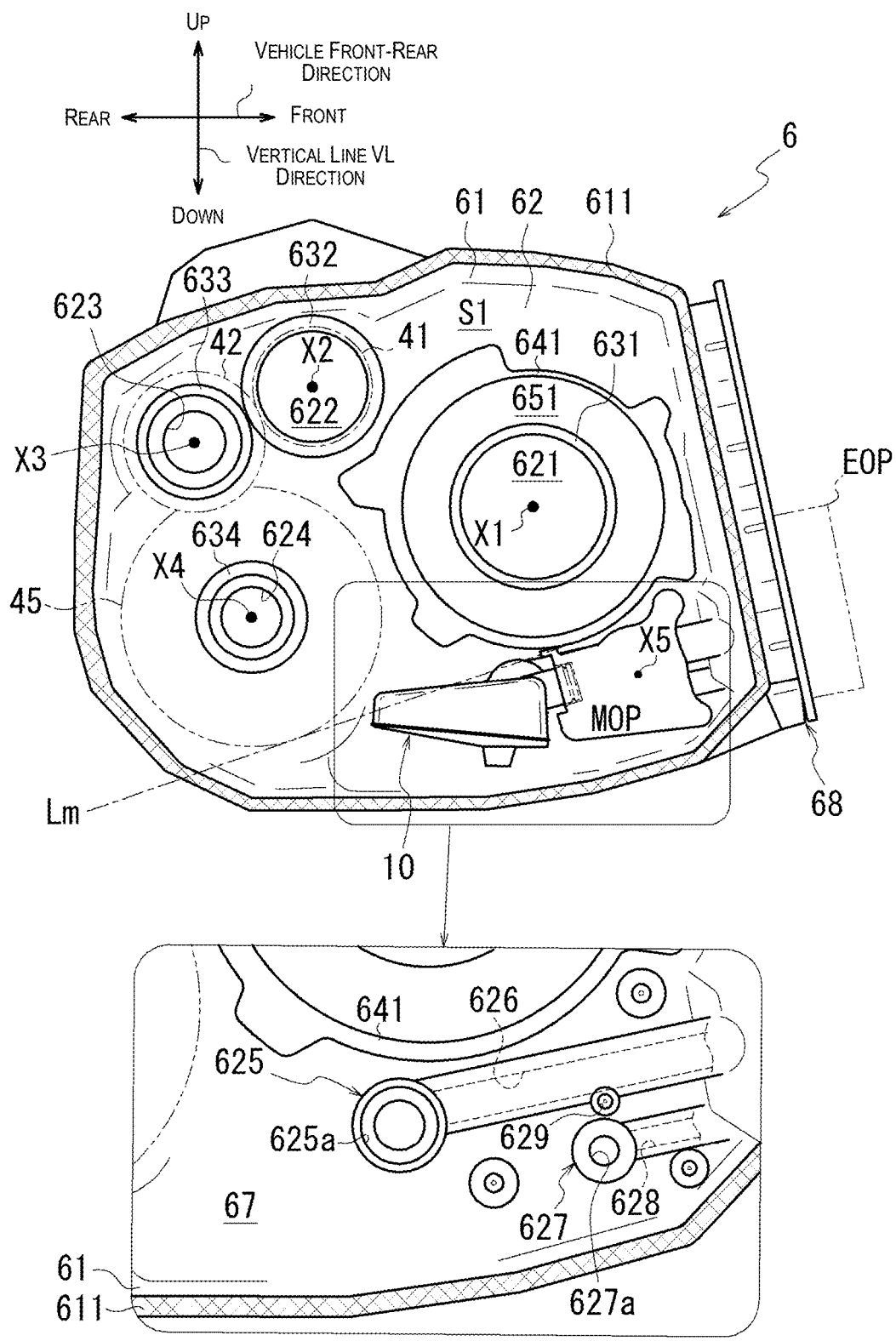
FIG. 3 is a schematic diagram illustrating the case from a second cover side.
Figure 4:
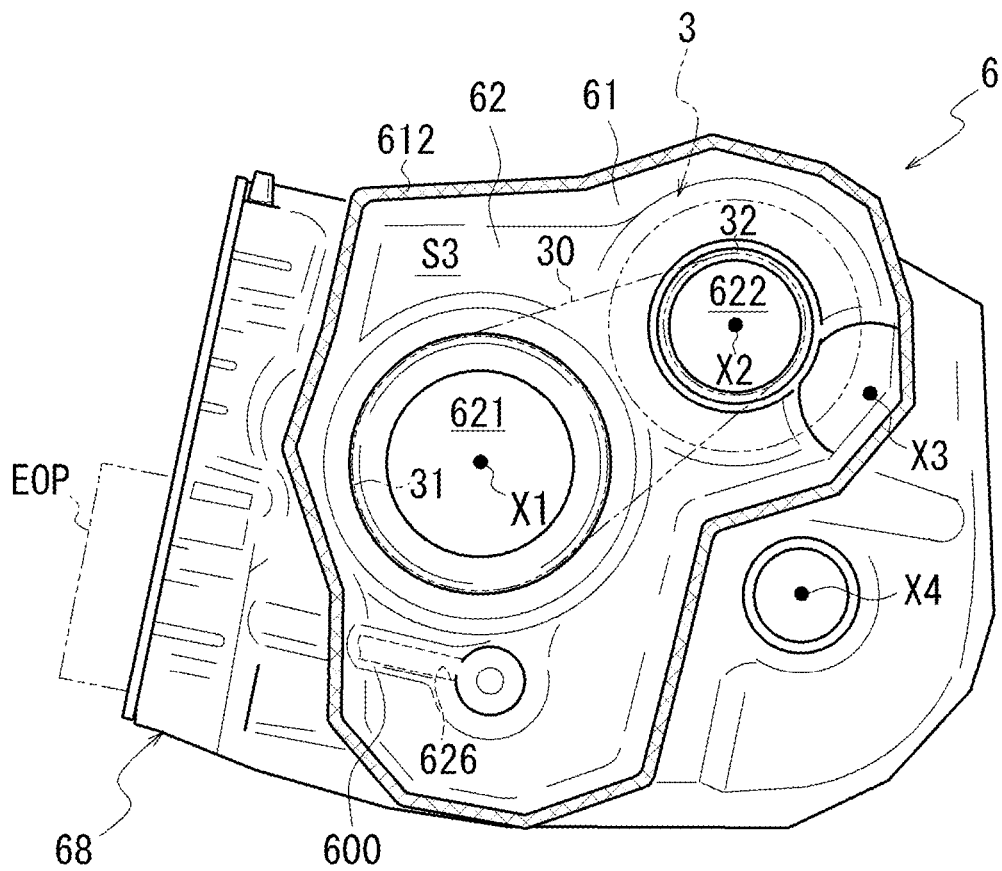
FIG. 4 is a schematic diagram illustrating the case from a first cover side.

FIG. 3 is a plan view of a case 6 as viewed from the second cover 8 side. FIG. 4 is a plan view of the case 6 as viewed from the first cover 7 side. Note that in the enlarged view of FIG. 3, the strainer 10 and the mechanical oil pump MOP are omitted, showing the areas around the connecting sections 625, 627 provided in a partition section 62. In FIGS. 3 and 4, hatching is used to clearly indicate the positions of the joining sections 611, 612.

As shown in FIG. 3, the case 6 has a cylindrical circumferential wall section 61 and the partition section 62.

The circumferential wall section 61 is arranged in the direction of the axis of rotation of a power transmission device 1 and forms the outer wall section of the power transmission device.

The partition section 62 is provided within the circumferential wall section 61, cutting across the axes of rotation (axes of rotation X1 to X4) of the power transmission mechanism.

As shown in FIG. 2, the partition section 62 divides the space inside the circumferential wall section 61 in two in the direction of the axis of rotation X1. One side of the partition section 62 in the direction of the axis of rotation X1 is a first chamber S1, and the other side is a third chamber S3.

The first chamber S1 accommodates the forward-reverse switching mechanism 2, the reduction mechanism 4, and the differential device 5. The third chamber S3 houses a variator 3.

In the case 6, an opening on the first chamber S1 side is sealed by the second cover 8 (torque converter cover). An opening on the third chamber S3 side is sealed by the first cover 7 (side cover).

In the case 6, the oil used for the operation of the power transmission device 1 or lubrication of component elements of the power transmission device 1 is collected below the space between the first cover 7 and the second cover 8 (the first chamber S1 and the third chamber S3).

As shown in FIG. 3, the end surface of the case 6 facing the second cover 8 side (toward the viewer) is a joining section 611 with the second cover 8. The joining section 611 is a flanged section that surrounds the entire circumference of the opening on the second cover 8 side of the circumferential wall section 61. A joining section 811 (see FIG. 2) on the second cover 8 side is joined to the entire circumference of the joining section 611. The case 6 and the second cover 8 are connected by bolts, not shown, to join the joining sections 611, 811 together. The opening of the case 6 is thus held in a state sealed by the second cover 8, forming the closed first chamber S1.

As shown in FIG. 3, the partition section 62 of the case 6 is provided in a direction essentially orthogonal to the axes of rotation (axes of rotation X1 to X4). Through-holes 621, 622, 624 and a support hole 623 are formed in the partition section 62.

The through-hole 621 is formed around the axis of rotation X1. A cylindrical support wall section 631 surrounding the through-hole 621 and a circumferential wall section 641 surrounding the outer circumference of the cylindrical support wall section 631 with a space in between are provided in the surface of the partition section 62 facing the first chamber S1 (toward the viewer). The cylindrical support wall section 631 and the circumferential wall section 641 project toward the viewer in FIG. 3 (toward the second cover 8 in FIG. 2).

A region 651 between the support wall section 631 and the circumferential wall section 641 is a cylindrical space accommodating a piston (not shown) of the forward-reverse switching mechanism 2, friction plates (forward clutch, reverse brake), etc.

An input shaft 34 (see FIG. 2) of the primary pulley 31 is rotatably supported on the inner circumference of the cylindrical support wall section 631 via bearings B.

As shown in FIG. 3, the through-hole 622 is formed around the axis of rotation X2.

In the power transmission device 1 mounted in the vehicle V, the axis of rotation X2 is positioned diagonally above toward the rear of the vehicle as viewed from the axis of rotation X1.

A cylindrical support wall section 632 that surrounds the through-hole 622 is provided in the surface of the partition section 62 facing the first chamber S1 (toward the viewer). The support wall section 632 projects toward viewer in FIG. 3 (toward the second cover 8 in FIG. 2).

The 631 rotatably supports the output shaft 33 of the secondary pulley 32 (see FIG. 2) via the bearings B.

As shown in FIG. 3, the support hole 623 is a closed-bottom hole formed around the axis of rotation X3.

In the power transmission device 1 mounted in the vehicle V, the axis of rotation X3 is positioned diagonally above toward the rear of the vehicle when viewed from the axis of rotation X1, and diagonally below toward the rear of the vehicle when viewed from the axis of rotation X2.

On the surface of the partition section 62 on the first chamber S1 side (toward the viewer), a cylindrical support wall section 633 that surrounds the support hole 623 is provided. In FIG. 3, the support wall section 633 protrudes toward the viewer (the second cover 8 side in FIG. 2). The support wall section 633 surrounds the outer circumference of the support hole 623 with a gap therebetween. The inner circumference of the support wall section 633 supports one end of the idler shaft 44 of the reduction mechanism 4 (see FIG. 2) rotatably via the bearings B.

As shown in FIG. 3, the through-hole 624 is formed centered on the axis of rotation X4.

In the power transmission device 1 mounted in the vehicle V, the axis of rotation X4 is positioned diagonally below toward the rear of the vehicle when viewed from the axis of rotation X1, diagonally below toward the rear of the vehicle when viewed from the axis of rotation X2, and diagonally below toward the front of the vehicle when viewed from the axis of rotation X3.

On the surface of the partition section 62 on the first chamber S1 side (toward the viewer), a cylindrical support wall section 634 that surrounds the through-hole 624 is provided. In FIG. 3, the support wall section 634 protrudes toward the viewer (the second cover 8 side in FIG. 2). The support wall section 634 surrounds the outer circumference of the through-hole 624 with a gap therebetween. The inner circumference of the support wall section 634 rotatably supports the differential case 50 of the differential device 5 (see FIG. 2) via the bearings B.

As shown in FIG. 2, the final gear 45, in the form of a ring as viewed from the direction of the axis of rotation X4, is fixed to the outer circumference of the differential case 50. The final gear 45 rotates about the axis of rotation X4 together with the differential case 50.

In the case 6 shown in FIG. 3, in a region below the arcuate circumferential wall section 641 and farther toward the front of the vehicle than the final gear 45, a housing section 67 is provided where the strainer 10 and the mechanical oil pump MOP (first pump) are arranged.

The strainer 10 is arranged in a position intersecting a straight line Lm connecting the outer circumference of the circumferential wall section 641 and the outer circumference of the final gear 45. The strainer 10 is arranged upwards toward the side of the circumferential wall section 641 while avoiding interference with the final gear 45.

The mechanical oil pump MOP is arranged toward the front side of the vehicle (right side in the diagram) as viewed from the strainer 10. The mechanical oil pump MOP is provided such that the axis of rotation X5 of the mechanical oil pump MOP is aligned in the direction of the axes of rotation X1 to X4 of the power transmission mechanism.

A connection section 625 with the strainer 10 and a connection section 627 with the mechanical oil pump MOP are provided in the partition section 62 are provided below the circumferential wall section 641, 62, as shown in FIG. 3.

A connection port 625a of the connection section 625 and a connection port 627a of the connecting section 627 open in the same direction. The connection port 625a of the connection section 625 communicates with an oil path 626 provided in the partition section 62. The connection port 627a of the connecting section 627 communicates with an oil path 628 provided in the partition section 62.

The oil paths 626, 628 extend in a straight line toward a housing section 68 (to the right in the diagram) inside the partition section 62. The oil path 626 connects to the electric oil pump EOP housed in the housing section 68 (housing chamber S2) via the oil paths inside case 6. The oil path 628 connects to the control valve CV (see FIG. 2) installed in the housing section 68 via the oil paths inside the case 6.

As shown in FIG. 4, in the surface of case 6 on the first cover 7 side, the region corresponding to the oil path 626 bulges toward the viewer (the first cover 7 side) below the circumferential wall section 61 that surrounds the third chamber S3.

On the end surface of the circumferential wall section 61 on the first cover 7 side, a joining section 612 with the first cover 7 is provided. The joining section 612 is a flanged section surrounding the entire opening of the partition section 62 facing the first cover 7. The inside of the joining section 612 is the partition section 62.

The joining section 711 (see FIG. 2) on the first cover 7 side is joined to the entire circumference of the joining section 612. The case 6 and the first cover 7 are connected by bolts, not shown, to join the joining sections 612, 712 together. The opening of the case 6 is thereby maintained in a sealed state by the first cover 7, forming the closed third chamber S3.

As shown in FIG. 4, the through-hole 622 is positioned diagonally above the rear side of the vehicle as viewed from the through-hole 621.

Inside the circumferential wall section 61, the primary pulley 31 and the secondary pulley 32 of the variator 3 are located in the upper region in the direction of the vertical line VL.

The circumferential wall section 61 is such that the bottom region where the primary pulley 31 is provided bulges significantly below the case 6, and a bulging region 600 corresponding to the oil path 626 is located below this bulging region.

As viewed from the direction of the axis of rotation X1, the bulging region 600 is provided in a range that extends across the circumferential wall section 61 on the side toward the front of the vehicle to the housing section 68.

As shown in FIG. 2, the housing section 68 is attached to a side surface of the case 6 toward the front of the vehicle.

The housing section 68 is provided with an opening facing the front side of the vehicle. The housing section 68 is provided along the axis of rotation X1. As viewed from the radial direction of the axis of rotation X1, the housing section 68 is formed having a range in the direction of the axis of rotation X1 from the region of the circumferential wall section 61 of the case 6 to the side of the first cover 7.

A region of approximately half of a bottom wall section 682 of the housing section 68 on the engine ENG side forms a single unit with the circumferential wall section 61. The region of approximately half of the opposite side of the bottom wall section 682 is an extension of the circumferential wall section 61, with a gap formed with the outer circumference of the first cover 7.

Figure 5:
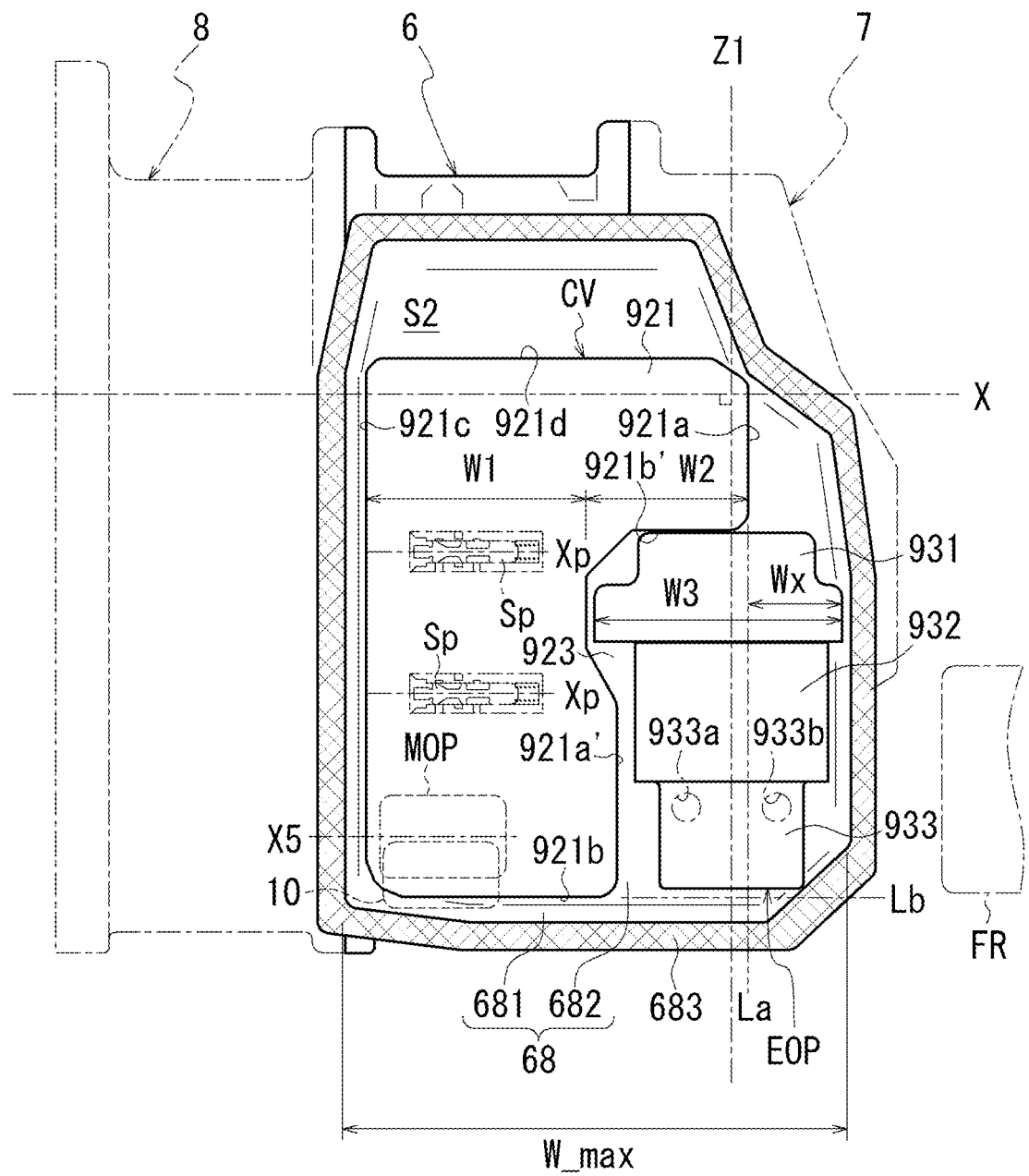
FIG. 5 is a schematic diagram illustrating the case from the front of the vehicle.

FIG. 5 is a diagram of the housing section 68 as viewed from the front of the vehicle. Note that in FIG. 5, cross-hatching is applied to a joining section 683 to clearly distinguish the location of the joining section 683 in a surrounding wall 681.

The housing section 68, as viewed from the front of the vehicle, has the surrounding wall 681 encompassing the entire outer circumference of the bottom wall section 682. The end surface of the surrounding wall 681 facing the viewer serves as the joining section 683 with the third cover 9. The joining section 683 is a flanged section surrounding the entire circumference of the opening of the surrounding wall 681 on the third cover 9 side.

As shown in FIG. 2, a joining section 911 on the third cover 9 side is joined to the entire circumference of the joining section 683. The housing section 68 and the third cover 9 are connected by bolts, not shown, with the joining sections 683, 911 joined to each other. The opening of the housing section 68 is thereby maintained in a sealed state by the third covered 9, forming the closed second chamber S2 (second chamber).

As shown in FIG. 5, the housing chamber S2 accommodates the control valve CV and the electric oil pump EOP.

In the housing chamber S2, the control valve CV and the electric oil pump EOP are arranged aligned with the direction of the axis of rotation X of the power transmission device 1 (power transmission mechanism).

As shown in FIG. 5, inside the housing chamber S2, the control valve CV is upright, so that the direction of stacking of the valve bodies 921, 921 is aligned in the front-rear direction of the vehicle (toward and away from the viewer in the figure).

In the housing chamber S2, the control valve CV is upright so as to satisfy the following conditions. (a) A plurality of pressure regulating valves SP (spool valves) inside the control valve CV are aligned in the direction of the vertical line VL (the vertical direction) based on the state of installation of the power transmission device 1 in the vehicle V, and (b) a direction of advancement and retraction Xp of the pressure regulating valves SP (spool valves) is along the horizontal line direction.

Advancement and retraction of the pressure regulating valves SP (spool valves) is thus not hindered, and the control valve CV is upright in the housing chamber S2. Thus, the housing chamber S2 is prevented from becoming larger in the front-rear direction of the vehicle.

As shown in FIG. 5, the control valve CV, as viewed from the front of the vehicle, forms an approximate L-shape provided with a cut-out 923 in the essentially rectangular valve body 921. The cut-out 923 in the housing chamber S2 is located under the region overlapping the first cover 7.

As viewed from the front of the vehicle, the cut-out 923 is a region formed by removing an area straddling an edge 921a and the lower edge 921b on the electric oil pump EOP side of the control valve CV.

In the control valve CV, providing the cut-out 923 forms a side edge 921a' offset from edge 921a to the opposite side (the edge 921c side), and an offset side edge 921b' from the lower edge 921b to the upper side (the edge 921d side).

These edges 921a', 921b' and an imaginary line La along the edge 921a and an imaginary line Lb along the edge 921b are the region of the cut-out 923. As viewed from the front of the vehicle, in the control valve CV, the cut-out 923 is formed as a region that can accommodate part of the electric oil pump EOP.

At least part of the electric oil pump EOP is accommodated in the cut-out 923 as viewed from the front of the vehicle.

The electric oil pump EOP has a basic configuration in which a control unit 931, a motor unit 932, and a pump unit 933 are arranged in a straight line in the direction of an axis of rotation Z1 of the motor.

The electric oil pump EOP is provided such that the axis of rotation Z1 is orthogonal to the axis of rotation X of the power transmission device 1. In this state, the axis of rotation Z1 of the electric oil pump EOP is arranged in the direction of the vertical line VL (the vertical direction). Further, in the electric oil pump EOP, the pump unit 933 is located at the very bottom of the housing chamber S2. An intake port 933a and a discharge port 933b of the pump unit 933 are located on the boundary toward the motor unit 932 and are each connected to an oil path inside the case.

The intake port 933a is connected to the strainer 10 via the oil path 626 (see FIG. 3) inside the partition section 62 described above.

The strainer 10 is housed in the first chamber S1, separately from the housing chamber S2 of the control valve CV (see FIG. 3). The mechanical oil pump MOP, to which the strainer 10 is attached, is also housed in the first chamber S1.

As shown in FIG. 5, as viewed from the front of the vehicle, the strainer 10 and the mechanical oil pump MOP are arranged at the position indicated by the dashed lines, away from the viewer behind the housing chamber S2. As viewed from the front of the vehicle, the strainer 10 and the mechanical oil pump MOP are provided in a positional relationship overlapping the control valve CV.

In the present embodiment, by positioning the pump unit 933 of the electric oil pump EOP at the very bottom of chamber S2, the vertical line VL direction position of the intake port 933a of the pump unit 933 is brought closer to the strainer 10.

The length of the oil path connecting the strainer 10 and the intake port 933a of the electric oil pump EOP is thereby reduced.

The upper side of the control valve CV extends up to above the electric oil pump EOP. As viewed from the direction of the vertical line VL (the direction of the axis of rotation Z1 of the electric oil pump EOP), the electric oil pump EOP is provided in a positional relationship overlapping the control valve CV.

The frame FR of the vehicle V is located on the side of the first cover 7, and there is no room to expand the housing HS in the vehicle width direction (the left-right direction in the diagram).

In the present embodiment, when the electric oil pump EOP is disposed in the housing chamber S2, instead of simply aligning the electric oil pump parallel with the control valve CV, the electric oil pump EOP is arranged in the cut-out 923 provided in the control valve CV.

Consequently, the electric oil pump EOP is arranged so that part of the frame FR protrudes toward the frame FR side from the cut-out 923. A protrusion width Wx is equal to a width W3 of the electric oil pump EOP in the direction of the axis of rotation X minus a width W2 of the cut-out 923 in the direction of the axis of rotation X (Wx=W3−W2).

Therefore, compared to simply aligning the control valve CV and the electric oil pump EOP in the direction of the axis of rotation X of the power transmission mechanism, the width of the housing chamber S2 can be reduced by the width W2 of the cut-out 923.

Thus, (a) by arranging the control valve CV upright, the housing chamber S2 can be prevented from increasing in size in front-rear direction of the vehicle. (b) By utilizing the cut-out 923 in the control valve CV, the housing chamber S2 can be prevented from increasing in size in the width direction of the vehicle.

By arranging both the control valve CV and the electric oil pump EOP upright within chamber S2, the housing chamber S2 can be prevented from increasing in size in the front-rear direction and the width direction of the vehicle.

Consequently, when the control valve CV and the electric oil pump EOP are arranged in the housing chamber S2 (the housing section 68), which is different from the first chamber S1, within the case 6, the housing HS of the power transmission device 1 can be prevented from increasing in size in the front-rear direction and the width direction of the vehicle.

The oil pressure control circuit 95 inside the control valve CV regulates the operating oil pressure of the power transmission mechanism (the forward-reverse switching mechanism 2, the variator 3, etc.) based on the oil pressure generated by the oil pump.

The power transmission device 1 is equipped with one each of the mechanical oil pump MOP and the electric oil pump EOP as oil pumps. These oil pumps suction the oil OL collected in the bottom of the housing HS through the strainer 10, pressurize the suctioned oil OL, and supply the oil OL to an oil pressure control circuit 95 (see FIG. 6) inside the control valve CV.

Figure 6:
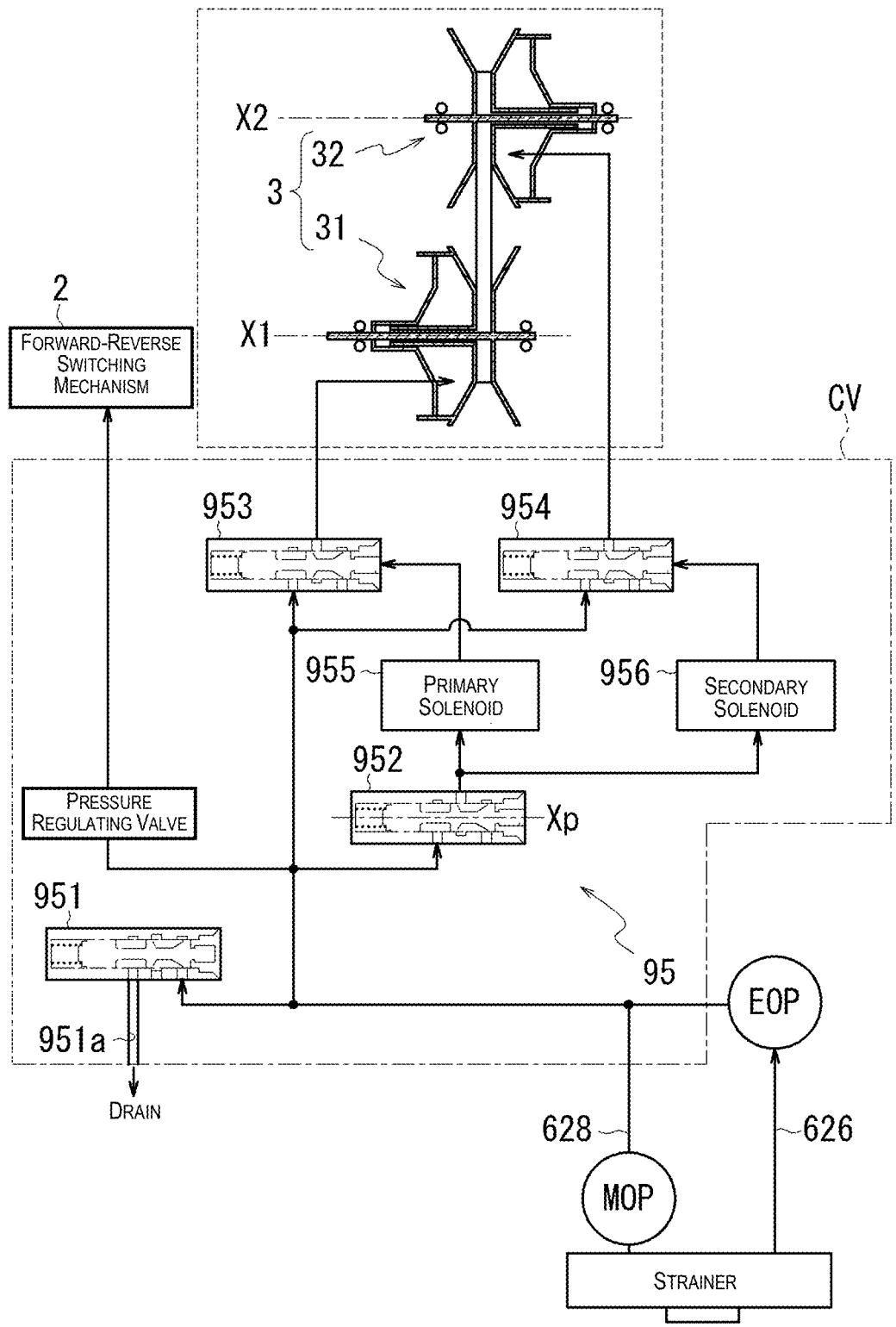
FIG. 6 is a diagram illustrating a general configuration of an oil pressure control circuit.

FIG. 6 is a diagram illustrating an example of the oil pressure control circuit 95 inside the control valve CV, showing parts related to regulation of the operating oil pressure of the variator 3 (the primary pulley 31, the secondary pulley 32) within the oil pressure control circuit 95.

A first pressure regulating valve 951 adjusts the line pressure based on the oil pressure generated by the oil pump OP by regulating the drainage amount of the oil OL in the first pressure regulating valve 951.

The line pressure adjusted by the first pressure regulating valve 951 is supplied to a primary pressure regulating valve 953, a secondary pressure regulating valve 954, and a second pressure regulating valve 952. Note that the line pressure is also supplied to other pressure regulating valves provided in the oil pressure control circuit 95.

The second pressure regulating valve 952 adjusts the pilot pressure based on the line pressure.

The pilot pressure adjusted by the second pressure regulating valve 952 is supplied to a primary solenoid 955 and a secondary solenoid 956.

The primary solenoid 955 and the secondary solenoid 956 operate based on instructions from a control device (not shown), regulating the signal pressure supplied to the primary pressure regulating valve 953 and the secondary pressure regulating valve 954.

In the primary pressure regulating valve 953 and the secondary pressure regulating valve 954, the spool valves move in the axial direction (the Xp direction in the diagram) in response to the signal pressure.

When the spool valves move in the axial direction, the line pressure regulated by the first pressure regulating valve 951 is further regulated to a pressure corresponding to the position of the spool valves, and then supplied to pressure chambers of the corresponding pulleys (the primary pulley 31, the secondary pulley 32).

The first pressure regulating valve 951 is located at the farthest upstream side (the oil pump OP side) in the oil pressure control circuit 95, where the oil pressure generated by the oil pump OP is first supplied.

In the first pressure regulating valve 951, part of the oil produced by the oil pump OP is drained during adjustment of the line pressure based on the oil pressure generated by the oil pump OP.

The first pressure regulating valve 951 is provided inside the control valve CV, and an oil discharge hole 951a from which the oil OL drained from the first pressure regulating valve 951 is discharged opens in the bottom of the control valve CV.

The control valve CV needs to be arranged so that the direction Xp of advancement and retraction of the pressure regulating valves (spool valves) within the oil pressure control circuit 95 is aligned with the horizontal line HL direction (see FIG. 5).

The control valve CV is therefore arranged upright within the housing chamber S2.

As shown in FIG. 5, in the control valve CV, the maximum width W2 of the cut-out 923 in the horizontal line direction is set so that enough of the width W1 is left to dispose the pressure regulating valves (spool valves) in the horizontal line direction to the side of the cut-out 923.

The edge 921a of the control valve CV on the electric oil pump EOP side is positioned beyond the first cover 7 relative to the axis of rotation Z1 of the electric oil pump EOP.

Thus, within the space of the housing chamber S2, almost all regions except the region needed for the installation of the electric oil pump EOP are disposed to overlap the control valve CV, as viewed from the front of the vehicle. In other words, in addition to the horizontal arrangement of the pressure regulating valves (spool valves), the cut-out 923 is provided to ensure that sufficient volume of the control valve CV is maintained for the installation of the electric oil pump EOP.

As described above, the power transmission device 1 for a vehicle according to the present embodiment has the following configuration.

(1) The power transmission device 1 comprises
a power transmission mechanism (the torque converter T/C, the forward-reverse switching mechanism 2, the variator 3, the reduction mechanism 4, the differential device 5) that transmits drive power from the engine ENG (drive source) to the drive wheels WH, WH,
a housing HS that accommodates the power transmission mechanism,
a control valve CV that controls the oil pressure supplied to the power transmission mechanism,
a mechanical oil pump MOP (first pump) and an electric oil pump EOP (second pump) that supply oil OL to the control valve CV.

The housing HS comprises
a first chamber S1 that accommodates the power transmission mechanism and the mechanical oil pump MOP, and
a second chamber S2 (housing chamber S2) arranged adjacent to the first chamber S1 in the horizontal line HL direction.

In the first chamber S1, the electric oil pump EOP is arranged so that the axis of rotation X5 of the electric oil pump EOP is aligned with the axis of rotation X of the power transmission mechanism.

In the housing chamber S2, the control valve CV is arranged upright.

In the housing chamber S2, the electric oil pump EOP is arranged upright so that the axis of rotation Z1 of the electric oil pump EOP is aligned in the vertical direction (direction of the vertical line VL).

With this configuration, since the axis of rotation X5 of the mechanical oil pump MOP and the axis of rotation Z1 of the electric oil pump EOP are not coaxially arranged within the housing HS, the two pumps can be arranged within the housing HS without enlarging the power transmission device 1 in the direction of the axis of rotation X.

(i) The housing HS includes
the case 6 inside which the first chamber S1 is formed,
the housing section 68 attached to the side of case 6 toward the front of the vehicle when the power transmission device 1 is mounted in the vehicle V, and
the third cover 9 that seals the opening of the housing section 68 from the front of the vehicle.

The housing chamber S2 is formed between the circumferential wall section 61 of case 6, the housing section 68, and the third cover 9.

The first chamber S1 and the housing chamber S2 (second chamber) are adjacent, separated by the circumferential wall section 61 of the case 6.

With this configuration, the control valve CV and the electric oil pump EOP are accommodated in the housing chamber S2 (second chamber), a separate space from the first chamber S1.

Thus, extra space is created in the case 6, thereby improving the layout within the housing HS (the case 6).

If the control valve CV is provided at the bottom of the housing HS, the power transmission device will be larger in the direction of the vertical line VL by an amount equal to the size of the control valve CV.

By installing the control valve CV in the housing chamber S2 provided in the housing HS toward the front of the vehicle, the size of the power transmission device 1 in the direction of the vertical line VL can be limited.

Further, when the control valve CV is installed in the housing chamber S2 provided in the housing HS toward the front of the vehicle, it is necessary to prevent the power transmission device 1 from becoming larger toward the front of the vehicle.

Therefore, the control valve CV is arranged upright so that the direction of advancement and retraction of the pressure regulating valves within the oil pressure control circuit 95 is aligned in the horizontal line direction. Arranging the control valve CV upright can minimize the extent to which the power transmission device 1 becomes larger toward the front of the vehicle.

(2) The control valve CV and the electric oil pump EOP are arranged in the housing chamber S2 in the direction of the axis of rotation X of the power transmission mechanism.

If the control valve CV and the electric oil pump EOP were aligned in the radial direction of the axis of rotation X of the power transmission mechanism, the power transmission device 1 would become larger in the radial direction.

As the control valve CV and the electric oil pump EOP are aligned in the direction of the axis of rotation X, the power transmission device 1 can be prevented from becoming larger in the radial direction.

For example, if the housing chamber S2 is located in the power transmission mechanism toward the front of the vehicle along the axis of rotation X, the power transmission device 1 can be prevented from becoming larger in the radial direction. In this case, the direction of the axis of rotation X corresponds to the vehicle width direction. The body frame FR and the engine ENG (drive source) are positioned on both sides of the power transmission device 1 in the vehicle width direction without extra space. Since there is relatively more space on the side of the power transmission device 1 toward the front of the vehicle, arranging the control valve CV and the electric oil pump EOP upright in the front-side housing chamber S2 allows the power transmission device 1 to be installed in the vehicle V without significantly affecting the vehicle layout.

(3) The housing chamber S2 (housing chamber S2) is located toward the front of the vehicle as viewed from the first chamber S1.

As viewed from the front of the vehicle, the control valve CV has the cut-out 923.

As viewed from the front of the vehicle, at least part of the electric oil pump EOP is positioned within the cut-out 923 of the control valve CV.

If at least part of the electric oil pump EOP is positioned within the cut-out 923 of the control valve CV, the width (range) of the housing chamber S2 in the direction of the axis of rotation X can be minimized.

As viewed from the front of the vehicle, the width in the direction of the axis of rotation X can be minimized by an amount equal to the positioning the electric oil pump EOP within the cut-out 923.

If a cut-out were not provided in the control valve CV, the control valve CV and the electric oil pump EOP would simply be arranged in the direction of the axis of rotation X. Utilizing the cut-out 923 makes it possible to reduce the volume of the housing chamber S2 in the direction of the axis of rotation X (increasing in size in the vehicle width direction) needed to install the control valve CV and the electric oil pump EOP compared to if there were no cut-out.

This allows for a more compact accommodation of the control valve CV and the electric oil pump EOP within the housing section 68.

(4) As viewed from the front of the vehicle, the cut-out 923 is provided below the control valve CV in the direction of the vertical line VL, based on the installation state of the power transmission device 1 in vehicle V.

As viewed from one side in the vertical line VL direction (vertical direction), the electric oil pump EOP and the control valve CV are positioned in an overlapping relationship.

With this configuration, as viewed from the direction of the vertical line VL, at least part of the electric oil pump EOP is positioned within the housing chamber S2 to overlap the control valve CV.

This allows the control valve CV and the electric oil pump EOP to be accommodated within the housing section 68.

Additionally, as viewed from the front of the vehicle, the strainer 10 positioned in the bottom of the case 6 is arranged in the first chamber S1, which is located behind the housing chamber S2. As viewed from the front of the vehicle, the strainer 10 is arranged in a positional relationship overlapping the lower region of the housing chamber S2. Therefore, the electric oil pump EOP can be positioned closer to the oil reservoir at the bottom of the case 6.

The length of the oil path within the case connecting the strainer 10 and the electric oil pump EOP can thereby be made shorter. A longer oil path in the case increases the resistance (suction resistance) when the electric oil pump EOP draws the oil OL through the strainer 10. By shortening the length of the oil path in the case, a reduction in suction resistance can be expected.

(5) The electric oil pump EOP comprises a motor unit 932 that houses a motor, and a pump unit 933 that suctions and pressurizes oil OL using the rotational force of the motor.

The motor unit 932 and the pump unit 933 are aligned in the direction of the axis of rotation Z1 of the electric oil pump EOP.

As viewed from the front of the vehicle, the electric oil pump EOP is positioned such that the axis of rotation Z1 of the motor is orthogonal to the axis of rotation X of the power transmission mechanism.

With this configuration, the electric oil pump EOP can be arranged without enlarging the housing chamber S2 in the direction of the axis of rotation X.

(6) The pump unit 933 is located below the motor unit 932.

With this configuration, the pump unit 933 can be arranged at the very bottom in the direction of the vertical line VL within the housing chamber S2. In this case, as viewed from the front of the vehicle, the oil intake port 933a of the pump unit 933 can be brought closer to the strainer 10 disposed at the bottom of the housing HS.

The length of the oil path within the case connecting the strainer 10 and the oil intake port 933a of the oil OL can thus be made even shorter, which can lead to a further reduction in suction resistance.

(7) The first chamber S1 has a strainer 10 arranged in the bottom of the first chamber S1.

The mechanical oil pump MOP (first pump) and the electric oil pump EOP (second pump) share the strainer 10.

The strainer 10 is arranged in the first chamber S1, separate from the housing chamber S2 of the control valve CV. Disposing the control valve CV is not disposed in the first chamber S1 increases the freedom of layout in the first chamber S1.

Additionally, the strainer 10 can be arranged in an optimal location within the first chamber S1, without having to consider the positional relationship with the control valve CV, thereby enhancing the flexibility of arrangement of the strainer 10.

For example, since the strainer 10 is smaller than the electric oil pump EOP or the control valve CV, the strainer can be arranged utilizing the gaps within the case 6.

For instance, in the case 6, there is extra space in the lower region between the rotating bodies, which are components of the forward-reverse switching mechanism 2, and the final gear 45. This space (the housing section 67) can accommodate the strainer 10, further limiting the size of the case 6 in the direction of the vertical line VL.

(8) As viewed from the front of the vehicle, the control valve CV is arranged in an overlapping relationship with the mechanical oil pump MOP and the strainer 10.

With this configuration, the control valve CV, the mechanical oil pump MOP, and the strainer 10 are arranged aligned in the front-rear direction of the vehicle. A width W_max of the housing chamber S2 need only accommodate the width W1 of the control valve CV plus the width Wx by which the upright electric oil pump EOP extends beyond the cut-out 923 in the direction of the axis of rotation X.

The electric oil pump EOP can thus be disposed in the housing chamber S2, minimizing the extent to which the housing chamber S2 increases in size in the direction of the axis of rotation X.

(ii) As viewed from the front of the vehicle, the electric oil pump EOP is positioned in a location overlapping the first cover 7 in the housing chamber S2 (case section). The control valve CV is positioned in a location overlapping the case 6 in the housing chamber S2.

The pressure regulating valves inside the control valve CV are arranged in multiple rows in the vertical line VL direction, aligned in the vehicle width direction.

The frame FR of the vehicle V is located on the first cover 7 side of the power transmission device 1.

Therefore, it is not preferable to enlarge the housing section 68 in the direction of the first cover 7 (the right side in FIG. 5).

Therefore, the electric oil pump EOP is arranged upright in a location overlapping the first cover 7 in the housing chamber S2, and the region of the control valve CV that houses the pressure regulating valves (spool valves) is arranged in a location overlapping the case 6.

The housing section 68 can thereby be appropriately prevented from increasing in size in the direction of the first cover 7 (right side in FIG. 5).

To arrange the pressure regulating valves inside the control valve CV in a direction aligned with the horizontal line HL, arranging the control valve CV horizontally within the housing chamber S2 would make the power transmission device 1 larger in the vehicle front-rear direction.

Therefore, in the foregoing embodiment, the control valve CV is arranged upright, and the pressure regulating valves (spool valves) are aligned in the direction of the horizontal line HL and arranged in multiple rows in the direction of the vertical line VL. The extent to which the power transmission device 1 increases in size in the vehicle front-rear direction can thereby be minimized.

By arranging the electric oil pump EOP in the cut-out 923 of the control valve CV within the housing section 68, the extent to which the power transmission device 1 increases in size in the direction of the axis of rotation X (vehicle width direction) is minimized. The area around the power transmission device 1 in the vehicle V has strict limitations in the vehicle width direction.

Therefore, by arranging the control valve CV upright and positioning the electric oil pump EOP in the cut-out 923 of the control valve CV, the power transmission device 1 can be appropriately positioned within these strict limitations.

In the foregoing embodiment, a case was illustrated in which the power transmission device 1 transmits rotation of the engine ENG to the drive wheels WH, WH, but it is also possible for the power transmission device 1 to transmit the rotation of at least one of the engine ENG or the motor (rotating electrical machine) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) without a shifting function. If the power transmission device does not have a shifting function and instead reduces and transmits rotation of the motor to the drive wheels WH, WH, the oil pressure control circuit for supplying the oil OL for cooling the motor and the oil OL for lubricating the reduction mechanism is arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling the driving of the motor.

Figure 7:
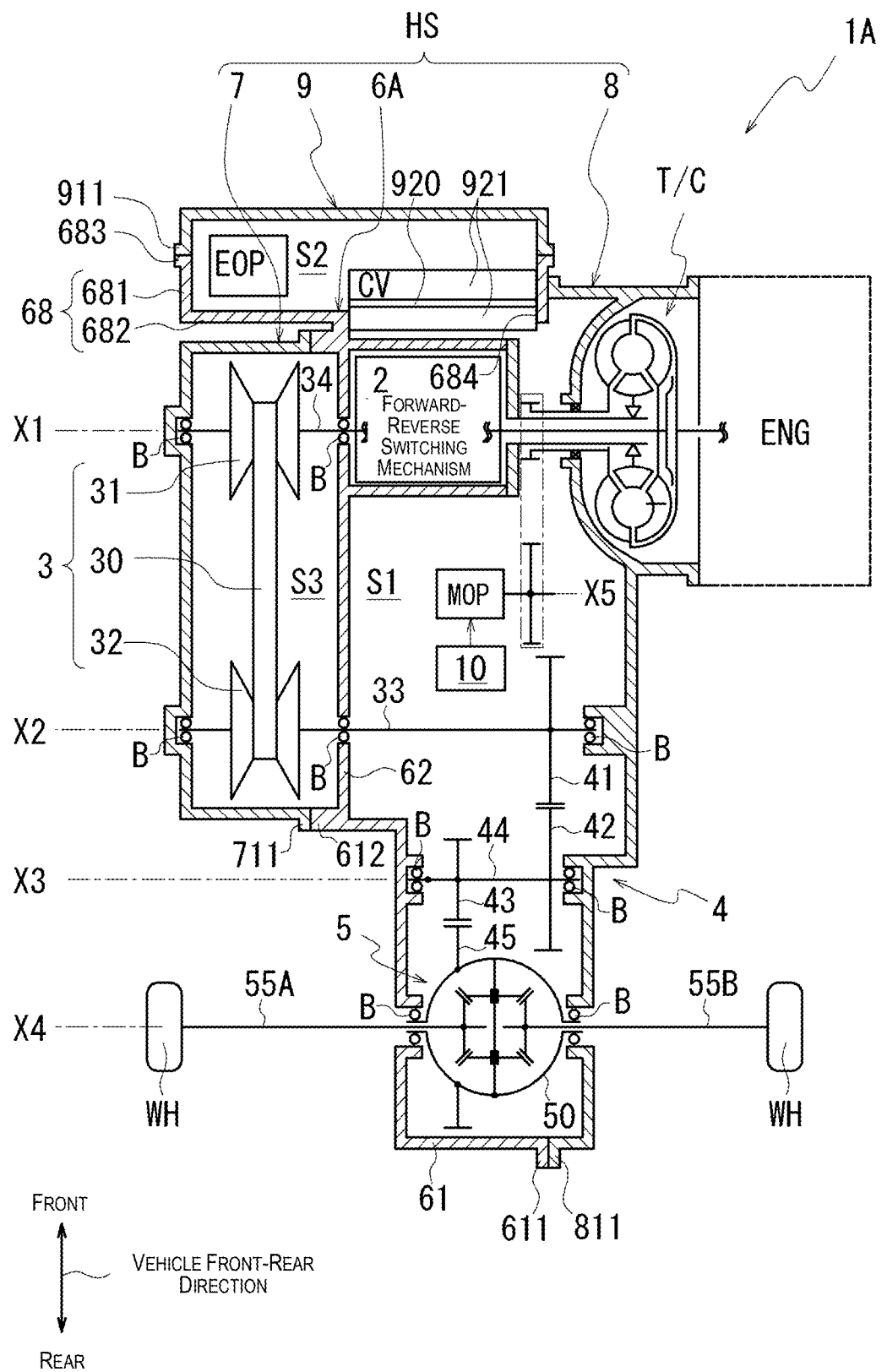
FIG. 7 is a schematic diagram illustrating a general configuration of the power transmission device according to a variant.

FIG. 7 is a schematic diagram illustrating the general configuration of a modified example of the power transmission device.

In the foregoing embodiment, a case was illustrated in which the first chamber S1 housing the strainer 10 and the housing chamber S2 utilizing the electric oil pump EOP and the control valve CV are divided by the bottom wall section 682 of the housing section 68, which is integral with the circumferential wall section 61. As shown in FIG. 7, a power transmission device 1A using a case 6A, in which the first chamber S1 and the housing chamber S2 communicate through an opening 684, is also possible.

In this power transmission device 1A, the control valve CV is arranged to block the opening 684 and partition the first chamber S1 and the housing chamber S2.

Even with the power transmission device 1A having this configuration, the power transmission device 1A can be prevented from increasing in size, while creating extra space within the housing HS, thereby improving the layout characteristics inside the housing HS.

Embodiments of the present invention have been described above, but the present invention is not limited to those aspects shown in the embodiments. The present invention may be appropriately modified within the scope of the technical concept of the invention.

DESCRIPTION OF THE REFERENCE SYMBOLS 1, 1A Power transmission device (power transmission mechanism); 2 Forward-reverse switching mechanism (power transmission mechanism); 3 Variator (power transmission mechanism); 4 Reduction mechanism (power transmission mechanism); 5 Differential device (power transmission mechanism); 6 Case; 668 Housing chamber (case section); 10 Strainer; 923 Cut-out; 932 Motor unit; 933 Pump unit; CV Control valve; MOP Mechanical oil pump (first pump); EOP Electric oil pump (second pump); HS Housing; S1 First chamber; S2 Second chamber; T/C Torque converter (power transmission mechanism); ENG Engine (drive source); X, X1-X4, Z1 Axes of rotation; and X5 Axis of rotation (axis of the first pump).

The invention claimed is:

1. A power transmission device for a vehicle, comprising:
a housing that accommodates a power transmission mechanism;
a control valve configured to control an oil pressure supplied to the power transmission mechanism; and
a first pump and a second pump configured to supply oil to the control valve,
wherein the housing includes
a first chamber that accommodates the power transmission mechanism and the first pump, and
a second chamber that is arranged adjacent to the first chamber in a horizontal line direction,
in the first chamber, the first pump is arranged such that an axis of rotation of the first pump extends along a direction of an axis of rotation of the power transmission mechanism,
in the second chamber, the control valve is arranged upright, and
in the second chamber, the second pump is arranged upright with an axis of rotation of the second pump extending along a vertical direction.

2. The power transmission device according to claim 1, wherein
the control valve and the second pump are aligned in the direction of the axis of rotation of the power transmission mechanism in the second chamber.

3. The power transmission device according to claim 2, wherein
the second chamber is located toward a front of the vehicle as viewed from the first chamber,
as viewed from the front of the vehicle, the control valve has a cut-out, and
as viewed from the front of the vehicle, the second pump is arranged at least partially in the cut-out.

4. The power transmission device according to claim 3, wherein
as viewed from the front of the vehicle, the cut-out is provided at a bottom of the control valve, and
as viewed from one side in the vertical direction, the second pump and the control valve are provided in an overlapping positional relationship.

5. The power transmission device according to claim 4, wherein
the second pump includes
a motor unit housing a motor, and
a pump unit configured to suction and pressurize the oil using a rotational force of the motor,
the motor unit and the pump unit are aligned in a direction of the axis of rotation of the second pump,
as viewed from the front of the vehicle, the second pump is provided so that an axis of rotation of the motor extends along a direction orthogonal to the axis of rotation of the power transmission mechanism.

6. The power transmission device according to claim 5, wherein
the pump is located below the motor unit.

7. The power transmission device according to claim 1, further comprising
a strainer provided in the first chamber, wherein
the first pump and the second pump share the strainer.

8. The power transmission device according to claim 7, wherein
as viewed from the front of the vehicle, the control valve is provided in a positional relationship overlapping the first pump and the strainer.

* * * * *